(12) United States Patent
Carlson et al.

(10) Patent No.: US 11,602,103 B2
(45) Date of Patent: Mar. 14, 2023

(54) OUTWARD ANGLED PLANT SUPPORT SYSTEM, METHOD, AND APPARATUS

(71) Applicants: Edward Scott Carlson, Delmont, PA (US); John Edward Aiken, Monroeville, PA (US)

(72) Inventors: Edward Scott Carlson, Delmont, PA (US); John Edward Aiken, Monroeville, PA (US)

( * ) Notice: Subject to any disclaimer, the term of this patent is extended or adjusted under 35 U.S.C. 154(b) by 595 days.

(21) Appl. No.: 16/505,281

(22) Filed: Jul. 8, 2019

(65) Prior Publication Data
US 2020/0029507 A1 Jan. 30, 2020

Related U.S. Application Data

(60) Provisional application No. 62/694,480, filed on Jul. 6, 2018.

(51) Int. Cl.
| | | |
|---|---|---|
| *A01G 9/12* | (2006.01) | |
| *A01G 13/02* | (2006.01) | |
| *A01G 17/06* | (2006.01) | |
| *A01G 13/00* | (2006.01) | |
| *A01G 13/10* | (2006.01) | |

(52) U.S. Cl.
CPC ........... *A01G 9/12* (2013.01); *A01G 13/0206* (2013.01); *A01G 17/06* (2013.01); *A01G 13/10* (2013.01); *A01G 2013/006* (2013.01)

(58) Field of Classification Search
CPC ....... A01G 9/12; A01G 13/0206; A01G 17/06
See application file for complete search history.

(56) References Cited

U.S. PATENT DOCUMENTS

| 24,712 | A | * | 7/1859 | Bever | A01G 9/12 47/44 |
|---|---|---|---|---|---|
| 88,074 | A | * | 3/1869 | Rothbum | A01G 9/12 47/44 |
| 317,385 | A | * | 5/1885 | Lipe | A01G 9/12 47/45 |
| 501,991 | A | * | 7/1893 | Craig | A01G 9/12 47/45 |
| 510,523 | A | * | 12/1893 | Smith | A01G 9/12 47/47 |
| 542,821 | A | | 7/1895 | Broughton et al. | |
| 610,803 | A | * | 9/1898 | Elliott | A01G 9/12 47/45 |

(Continued)

FOREIGN PATENT DOCUMENTS

| FR | 2349276 A1 * | 11/1977 | ............. A01G 17/06 |
|---|---|---|---|
| FR | 2912031 A1 * | 8/2008 | ............... A01G 9/12 |
| WO | WO-2005043982 A1 * | 5/2005 | ............... A01G 9/12 |

*Primary Examiner* — Jessica B Wong (57) ABSTRACT

The present invention provides structures that maximize the use of minimal ground space or pot soil by providing generally vertical outward-sloping multiple cords or net trellis such as to offer increasing volume for plant foliage with height, which is adjustable to the user's desire. A compact kit includes at least two elongated leg member, and at least one elongated support, and can be assembled into structures up to approximately twice as wide at the top as at the base where the plants begin growing in soil. Flaccid replaceable cords when installed incline generally outward and upward to top horizontal rods supporting wining plants to grow generally vertically and even horizontally across the top.

3 Claims, 8 Drawing Sheets

(56) References Cited

U.S. PATENT DOCUMENTS

| | | | | |
|---|---|---|---|---|
| 619,379 | A | * | 2/1899 | Williams ................. A01G 9/12 47/44 |
| 675,850 | A | * | 6/1901 | Brunneder ............... A01G 9/12 47/45 |
| 811,276 | A | * | 1/1906 | Cooper ................... A01G 9/12 47/45 |
| 950,639 | A | * | 3/1910 | Petzler .................... A01G 9/12 47/45 |
| 1,106,624 | A | * | 8/1914 | Cadwallader ........... E04F 10/02 47/22.1 |
| 1,974,367 | A | | 5/1933 | Schaible |
| 2,227,818 | A | * | 1/1941 | Bayouth .................. A01G 9/12 47/58.1 R |
| 2,486,261 | A | * | 10/1949 | Claiborne ................ A01G 9/12 47/46 |
| 3,765,134 | A | * | 10/1973 | Gilchrist ............. A01G 9/1469 52/63 |
| 4,301,618 | A | * | 11/1981 | August ................... A01G 9/12 47/46 |
| 5,357,710 | A | * | 10/1994 | Dulik ..................... A01G 17/06 47/48.5 |
| 6,378,245 | B1 | | 4/2002 | Summers |
| 7,017,299 | B1 | * | 3/2006 | Speed ..................... A01G 9/12 47/21.1 |
| 8,272,160 | B1 | | 9/2012 | Hamann |
| 11,058,068 | B1 | * | 7/2021 | Gravel ..................... A01G 9/12 |
| 2005/0086859 | A1 | * | 4/2005 | Bruno ..................... A01G 9/12 47/46 |
| 2006/0150497 | A1 | * | 7/2006 | Kaprielian ............. A01G 31/02 47/62 R |
| 2008/0028677 | A1 | * | 2/2008 | Shelton ................... A01G 9/12 47/46 |
| 2009/0145024 | A1 | * | 6/2009 | Mendoza-Sosa ........................... A01G 13/0231 47/24.1 |
| 2013/0014433 | A1 | * | 1/2013 | Pratt ....................... A01G 9/12 47/30 |
| 2013/0145686 | A1 | * | 6/2013 | Dame ..................... A01G 9/12 47/45 |
| 2017/0001276 | A1 | | 5/2017 | Harger |
| 2018/0177141 | A1 | * | 6/2018 | Lamoureux ............ A01G 13/06 |
| 2018/0242534 | A1 | * | 8/2018 | Herridge ................ A01G 22/00 |
| 2018/0310491 | A1 | * | 11/2018 | Cunial .................... A01G 9/12 |
| 2019/0053440 | A1 | * | 2/2019 | Lysak ..................... A01G 13/10 |
| 2019/0059240 | A1 | * | 2/2019 | Scott ..................... A01G 9/022 |

* cited by examiner

OUTWARD ANGLED PLANT SUPPORT SYSTEM, METHOD, AND APPARATUS

CROSS REFERENCE TO RELATED APPLICATION

This patent application is related to and claims priority from U.S. Provisional Patent Application Ser. No. 62/694,480 filed Jul. 6, 2018.

FIELD OF THE INVENTION

The present invention relates, in general, to growing plants or vines that benefit from a support system as they grow taller and, more particularly, this invention relates to an improved system and trellis-like apparatus that provides an angle of growth and multiple surfaces that expands growing area and volume in the generally vertical direction from a minimal footprint, especially for vining plants.

BACKGROUND ART

Prior to the conception and development of the present invention, the market place and patent literature are replete with an abundance of devices and systems for aiding the growth of climbing plants or those that benefit from a system or apparatus to assist their generally vertical growth, for both tomatoes and vining plants. Most ubiquitous is the wire tomato cage that may have 3 or 4 horizontal rings of increasing diameter attached to 3 or 4 wire legs that must be pressed into the ground adjacent the plant. They are notorious for rusting, the legs getting bent on any rocks in the ground, and frequently falling over from plant weight. They, like many other cage or ring types, rely on passive support by the plants draping themselves over the rings. There are others like a tomato tower that can be expanded in a strictly vertical direction.

Hamann in U.S. Pat. No. 8,272,160 discloses a vine stand that includes a wire cage which curves outward, and then back in such that at the top it has about the same or less cross sectional area as at the base. There are many obelisk or pyramid-type plant and vine growing structures that come nearly to a point at the top, thereby offering decreasing volume as height increases. Schaible in U.S. Pat. No. 1,974,367 teaches the use of vertical strings for a vine, but they come to a point at the top. Y-shaped trellises have been use for grapes for decades, but they offer greater growth volume only near the top. Trellis designs for growing hops have been described with strictly vertical wires or twine, such as by Broughton in U.S. Pat. No. 542,821. Summers in U.S. Pat. No. 6,378,245 teaches a kit employing a braced T-shaped pole and for supporting strictly vertical netting, and it would not be amenable to sloping in any direction. In US published application 2017/0127621, Harger discloses a plant trellis system for a bucket that can have somewhat vertical legs that can be at variable angles. It can be designed for a round or square bucket, but the clamps for the bucket must be made for a specific size and shape. Thus, Harger's system lacks versatility and is not for plants in the ground.

The prior art apparently places priority on the greater stability of being wider at the bottom and declines to take on the challenges of sloping outward in the generally upward direction. None of the prior art teaches optimizing the use of a limited amount of ground plant area, greater air and sunlight exposure, easy picking of the vegetable product, or growing on a steep hillside. For whatever reasons, others have overlooked issues such as crowding of growth with increasing height, growing area across the top, and ease of picking. Furthermore, trellis designs ignore a major nemesis of urban, suburban, and rural gardening—deer devouring the vegetation.

DISCLOSURE OF INVENTION

The present invention conveniently maximizes the use of a minimal foot print by providing at least two outward-sloping upwards cords or a net trellis such as to offer increasing volume for plant foliage with height, which is adjustable to the user's desire. A compact kit can be assembled into a structure approximately twice as wide at the top as at the base where the plants begin growing in soil. Flaccid reusable or disposable cords or nets inclined generally downward and inward from top horizontal rods support wining plants to grow generally vertically and even horizontally across the top.

In one preferred embodiment, the structure is basically an elongated V and typically will have an outer net to protect against animals and create a space between it and the foliage.

BRIEF DESCRIPTION OF THE DRAWINGS

FIG. 16 is a flowchart for the method of the present invention.

FIG. 17 provides a flowchart for an alternative method of the present invention.

BEST MODES FOR CARRYING OUT THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figures 1, 2:
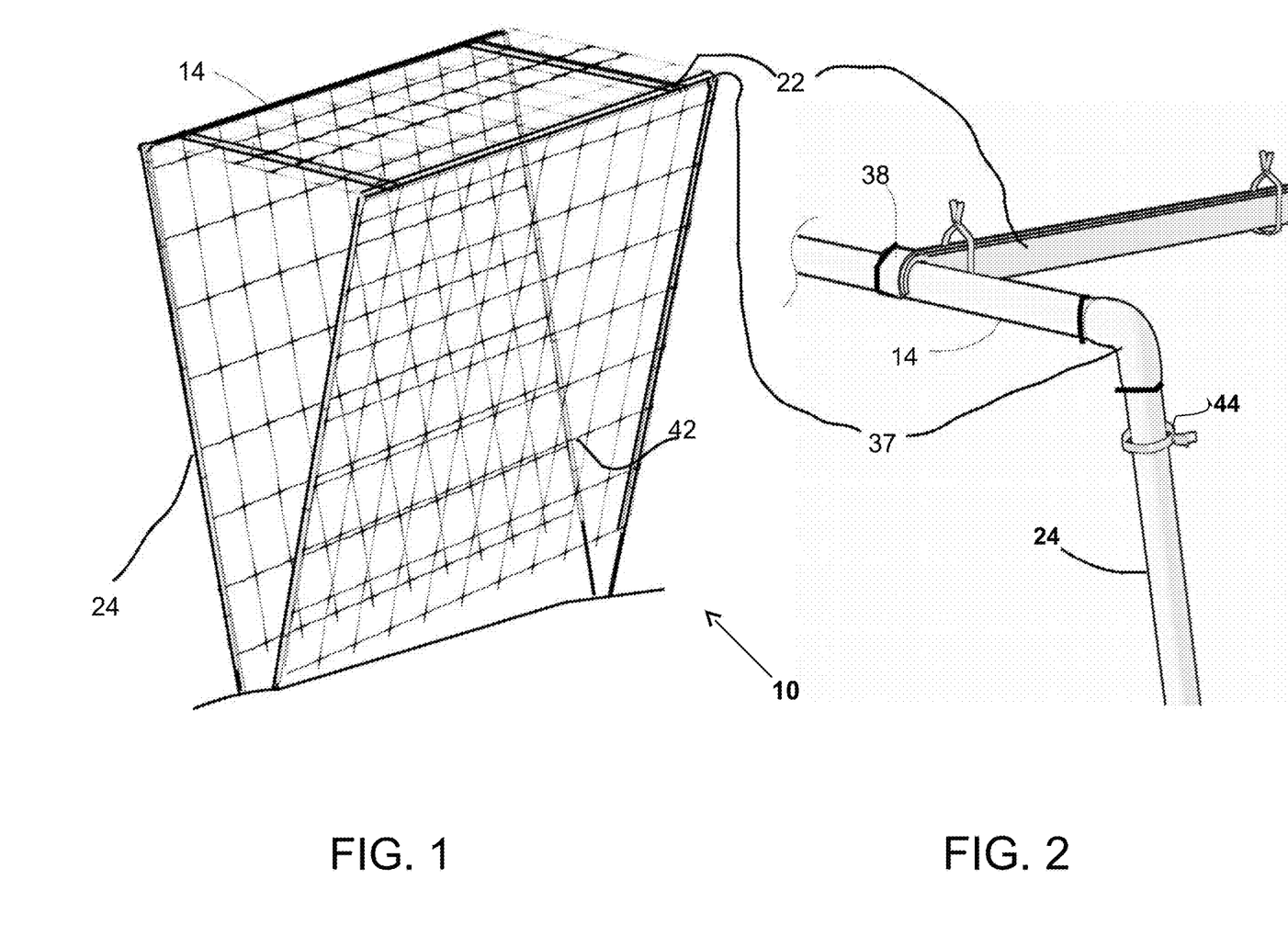
FIG. 1 provides a perspective schematic view of a preferred embodiment of the present invention in an elongated V.
FIG. 2 is a perspective view of the preferred cross-brace attachment.

Parts of Vee Trellis in FIG. 1 and following are described as follows:

10—the invention in general
14—frame horizontal rod
20—trellis cords
21—trellis cord branch
22—top cross brace
24—frame side leg member
25—rebar rod
26—ground support rods
27—Tubular sections of legs and rods
28—frame lower-corner fitting
29—tubular rod section
32—ground staples
36—Elbow fitting
37—Tee fitting
40—protective fence—chicken wire or similar
46—optional perch deterrent stub
47—notch in stub
48—perimeter cord perch deterrent Referring initially to FIG. 1, a preferred embodiment of the present invention, shown generally as 10, is illustrated in this perspective view. The sloped leg members 24 are one piece each and can be driven directly into the ground, a straw bale, or soil, or other growing medium in a container, but, for taller structures especially, it is preferred that a stabilizer stake or ground support rod as detailed in FIGS. 6 and 7 be used to prevent tipping over due to wind or the weight of the vegetables. A net 40 is draped over the upper horizontal rods 14 and staked into the ground 50. It is used to support growing plants such as to keep them off the ground and climbing upward.

FIG. 2 is a perspective view of the preferred cross-brace attachment 22. The saddle engagement portion 38 allows the cross brace 22 to be attached anywhere along the horizontal bar 14.

Figure 3:
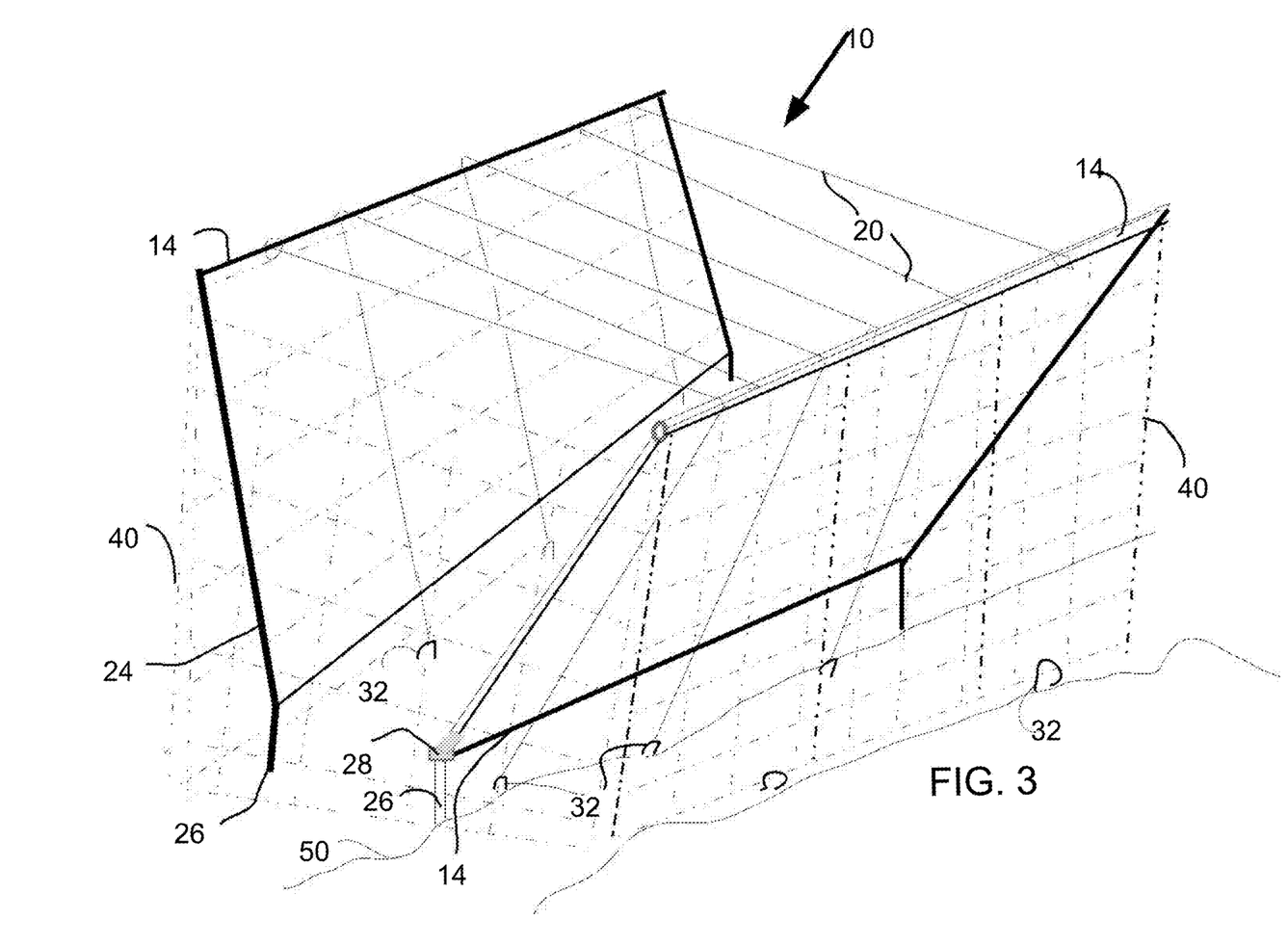
FIG. 3 is a perspective view of an alternative embodiment of the elongated V trellis with additional features.

FIG. 3 is a perspective view of an alternative embodiment of the elongated V trellis with additional features. Generally vertical leg members 24 are secured at ground level and incline away from the opposing leg member. The angle may adjustable at the frame lower corner fitting 28. Various stake arrangements, some described later, is preferred for fixing the angle once established and also for a generally more stable structure. The flaccid cords 20 slope outward from the plant base area and provide the wining support for plants and also help reinforce the structure by tying to one horizontal rod 14, coming across the opposing horizontal rod, and then anchored near the ground or other growing medium. The horizontal rods 14 provide the upper support for the cords 20, and also for protective netting 40 to keep deer and birds away from the growing plants. There are multiple ways to secure the cords 20 near the base of the plants, such as ground staples 32. In this one configuration, the tee connectors 28 attach near the top of ground pegs 26, and the tee connectors allow for varying the slope of the legs 24, which could range up to 30 degrees from straight vertical. Other methods of supporting the legs at an angle are presented later, and it is recognized that even others not presented are options as well. Herein, "generally vertical" is taken to mean no more than 30 degrees from straight-up vertical. The present invention contrasts considerably from existing art in the way it expands growing volume in the vertical direction from a minimal footprint while providing support for vertically growing plants, and solving concerns about stability.

Figure 4:
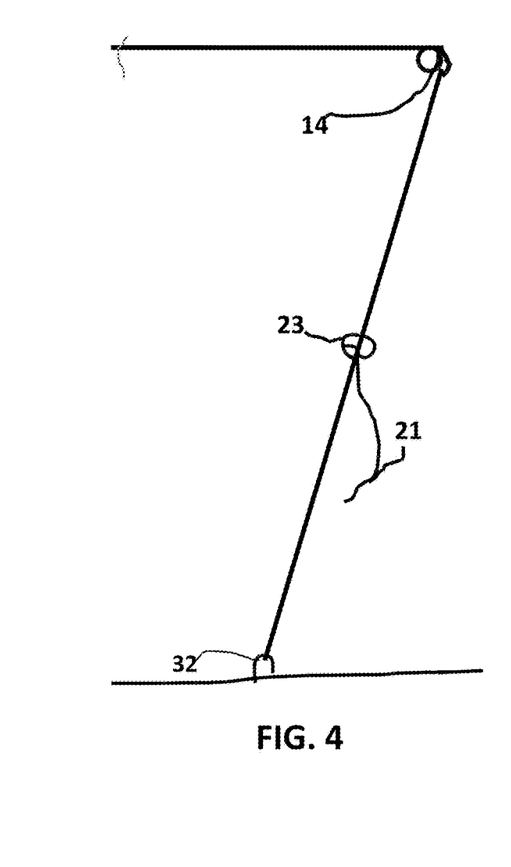
FIG. 4 is an end elevation view of an alternative cord feature of the present invention.

FIG. 4 is an end elevation view of an optional feature of the present invention. The trellis cords 20 can be enhanced considerably in utility by tying in a branch portion 21 that has a free end to tie onto plant stems, particularly for plants that do not climb the trellis strings or nets, such as most tomatoes. All known string, wire, and net trellises rely on simply passive support for the plants that vine onto the support, or just lean against it to garner some support. The strings 20 of the present invention provide the passive support of a member to which wining plants can entwine, but also enable active support by tying the free end of 21 to a plant stem.

Figure 5:
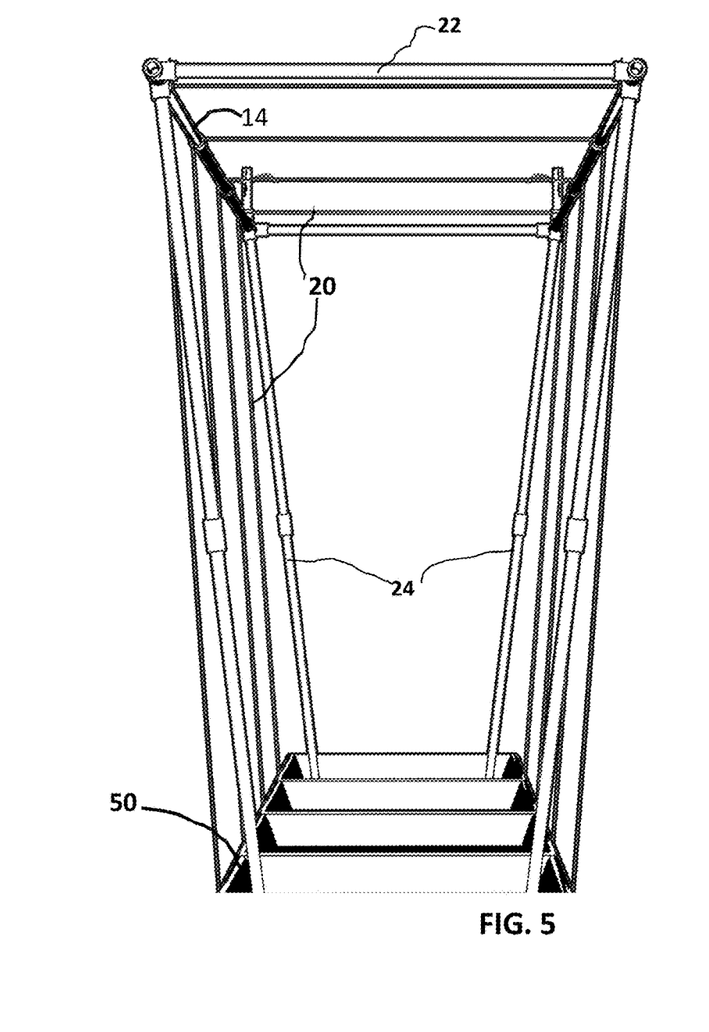
FIG. 5 is a perspective end view of an unprotected embodiment of the present invention.

FIG. 5 is a perspective end view of an unprotected embodiment of the present invention. The sloped leg members 24 are secured in the ground 50 by one of any various means, such as one shown in FIG. 7. The cords 20 are draped over the horizontal rods 14 and the two free ends secured to the ground 50 with a pegs or staples.

Figure 6:
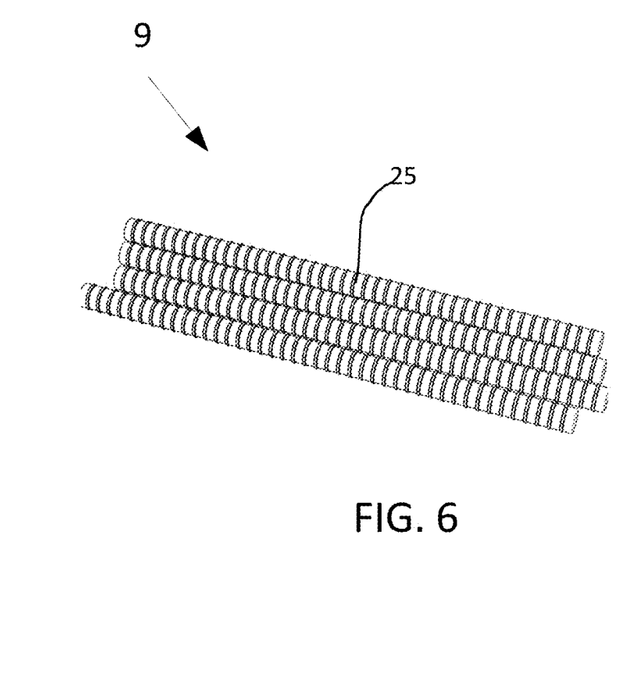
FIG. 6 provides a plan view of the optional set of ground stakes for the present invention.

FIG. 6 provides a plan view of an optional set of ground support rods 25 for the present invention. For a typical four-foot long trellis section, four support rods 25 would be needed, one for each generally vertical leg. Preferably, the ground support rods 25 are of metal that can be driven into rocky soil.

Figure 7:
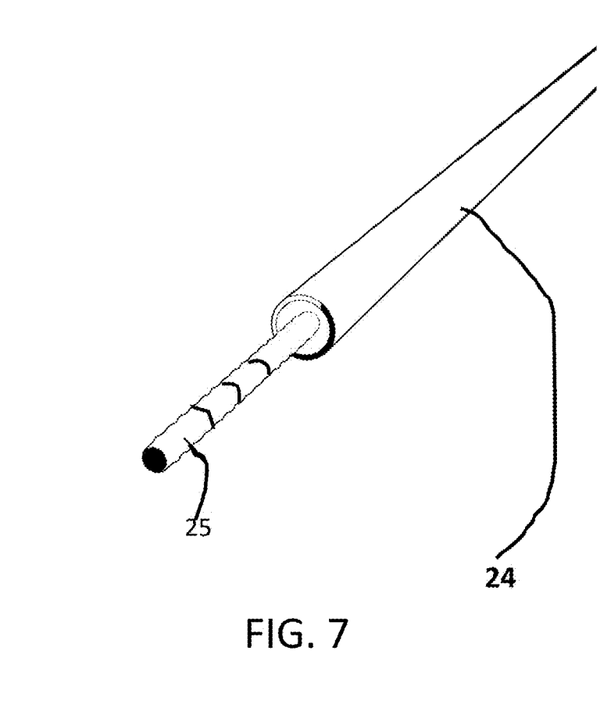
FIG. 7 provides a perspective view of a manner for securing the elongated V structure when used on the ground of a typical outdoor garden.

FIG. 7 provides a perspective view of a manner for securing the elongated V structure when used on the ground of a typical outdoor garden. A ground support rod 25 in the form such as a rebar rod about 18 inches long is driven part way into the ground 50 at the angle desired. A template, not shown, may be employed to get a proper angle at the start. The hollow tube of leg 24 then slips over the above-ground portion of the rebar rod 25. Therefore, the outside diameter of the ground support rod 25 must be less than the inside diameter of the leg 24. The term "ground" herein refers to the soil in the area surrounding a plant and can also be applied to soil in a container such as a plant pot or bucket. For protection from animals that may eat the plants or vegetables, a protective net may also be draped over or supported from the horizontal rods 14, as illustrated in FIG. 1.

Figure 8:
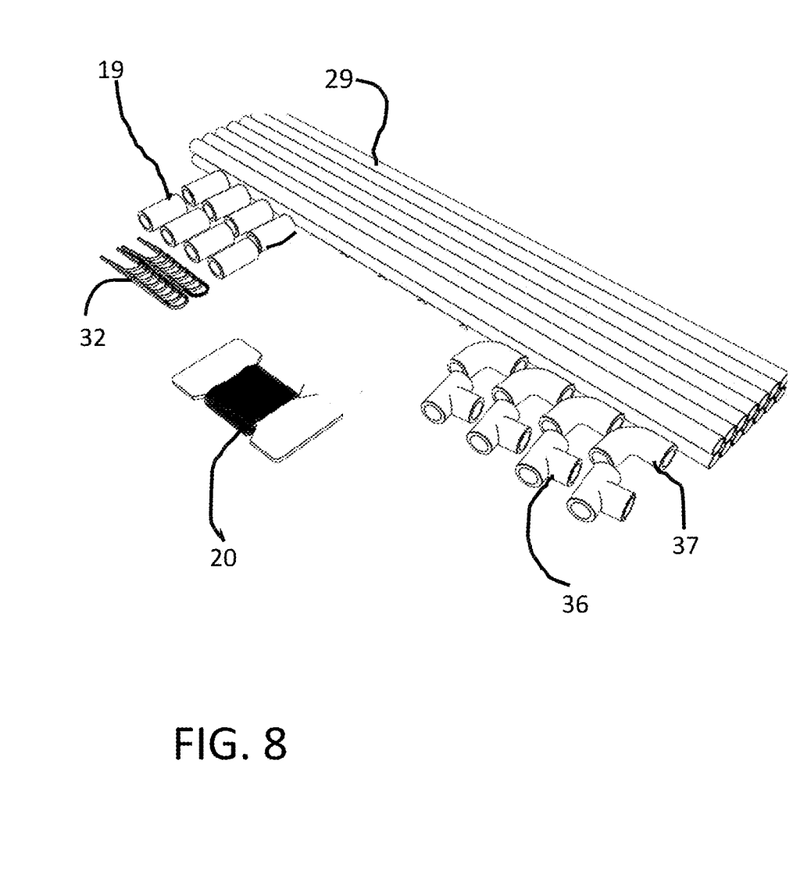
FIG. 8 provides a plan view of a kit with the typical parts for the erecting the structure of the present invention.

FIG. 8 provides a perspective view of a kit version of the present invention. The leg members 24 and horizontal rods 14 break down into tubular sections 27 for compact storage and shipping. There are also ground anchors 32 and a spool of cord 20.

Figure 9:
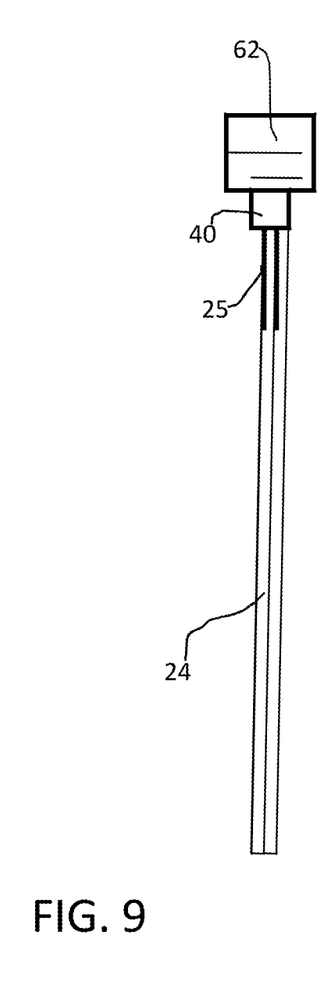
FIG. 9 provides an elevation view of an alternative kit with the typical parts for the erecting the structure of the present invention.

FIG. 9 provides a perspective view of an alternative kit version of the present invention. The leg members 24 and horizontal rods 14 are single pieces. Both kits typically will have instructions for installation and use.

Figure 10:
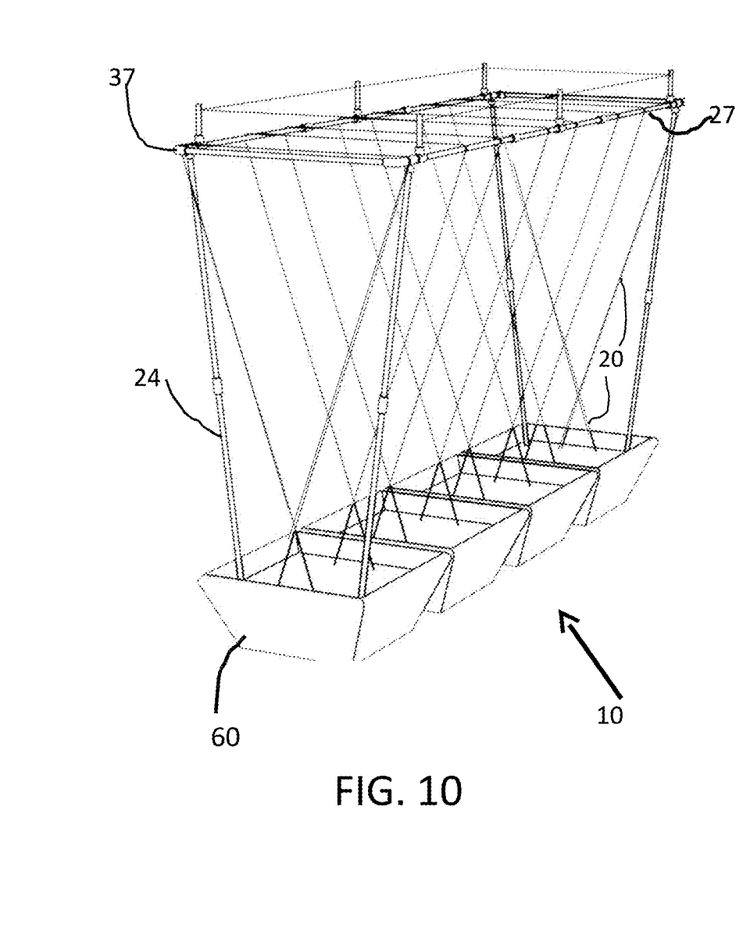
FIG. 10 provides a side perspective view of an application of the present invention to plant growing in containers.

FIG. 10 provides a side perspective view of an application of the present invention 10 to plants growing in containers 60. The legs 24 can be pushed into the soil in the containers 60 as far as possible. The flaccid cords 20 are then strung over the horizontal rods 14, made of tubular sections 27, and ends attached to the pot 60 or something in it.

Figure 11:
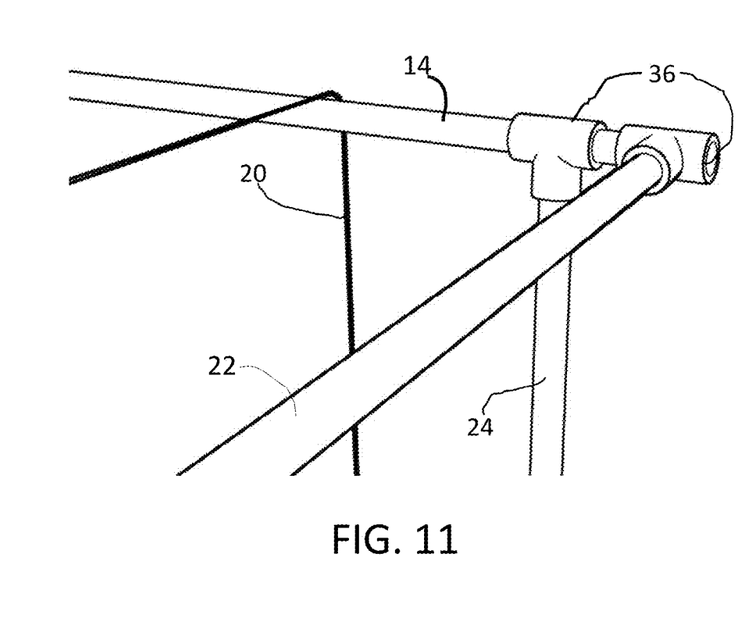
FIG. 11 is a perspective end view of the application of the present invention also shown in FIG. 9

FIG. 11 is a perspective end view of the application of the present invention also shown in FIG. 9. An additional tee fitting 36 at the top end where the cross brace 22 connects allows for additional horizontal rods 14 to be attached allowing for a modular system of extensions.

Figure 12:
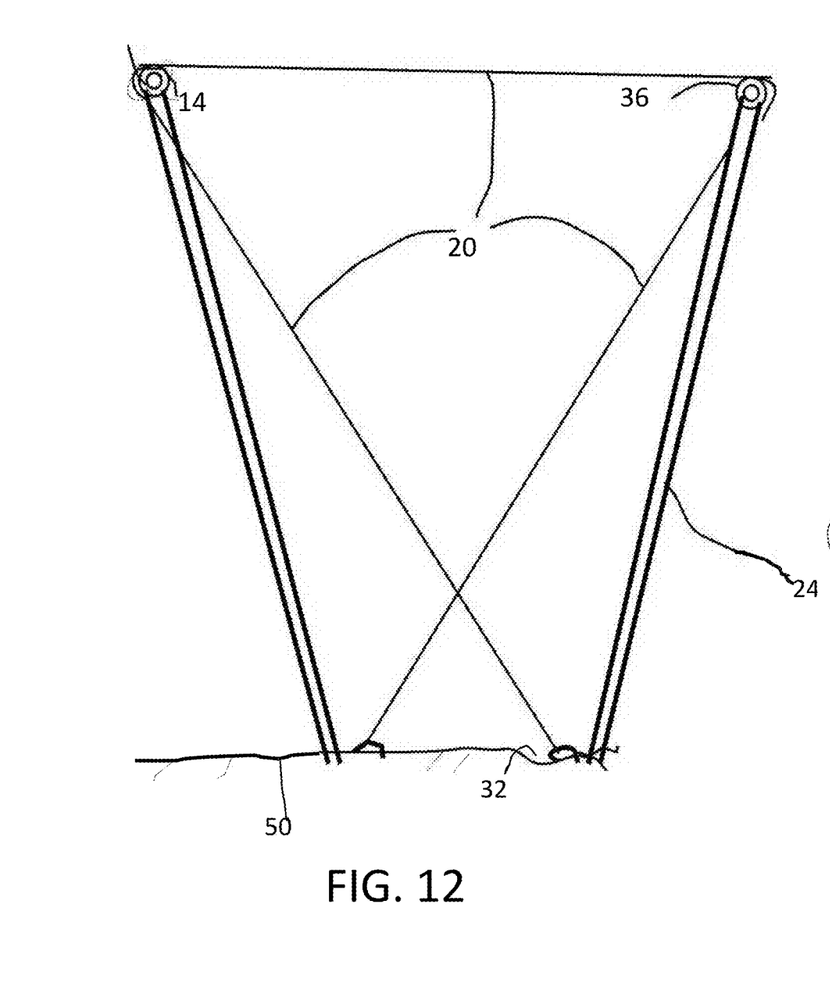
FIG. 12 provides an end elevation view of a variation of the system and method of the present invention.

FIG. 12 provides an end elevation view of a variation of the system and method of the present invention, illustrating how the cords 20 can be crossing to opposite sides proximal the plant ground area 50. The cords 20 typically would come horizontally first across a horizontal rod 14 then slope down and across the plant area 50. This crossing pattern of the cords 20 enhance the ease by which the vining plants can latch onto a cord 20 and grow up either of two cords. This would not be feasible with a net trellis.

Figure 13:
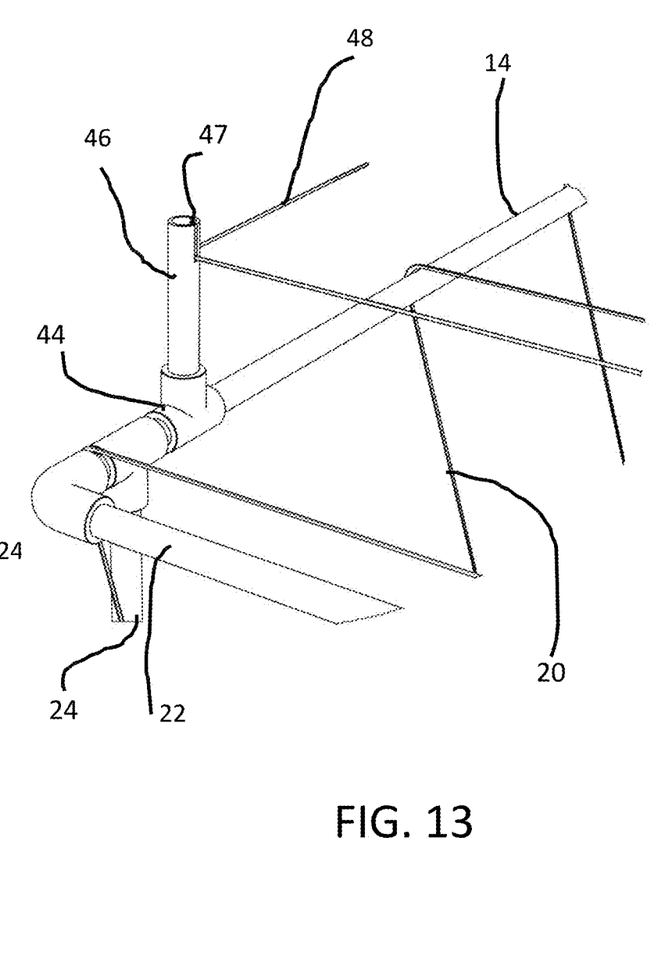
FIG. 13 provides a perspective view of an optional perch deterrent addition.

FIG. 13 provides a perspective view of an optional perch deterrent addition constructed with an additional tee 44 adjacent the tee at the top of the vertical leg 24. A short stub 46 about 2 to 4 cm high extends vertically from the tee 44 and has a top notch 47. A string 48 slides tightly into the notches at the four corners and resides above the horizontal rods on all sides to help deter birds from perching on the rods and defecating on the plants and vegetables below.

Figure 14:
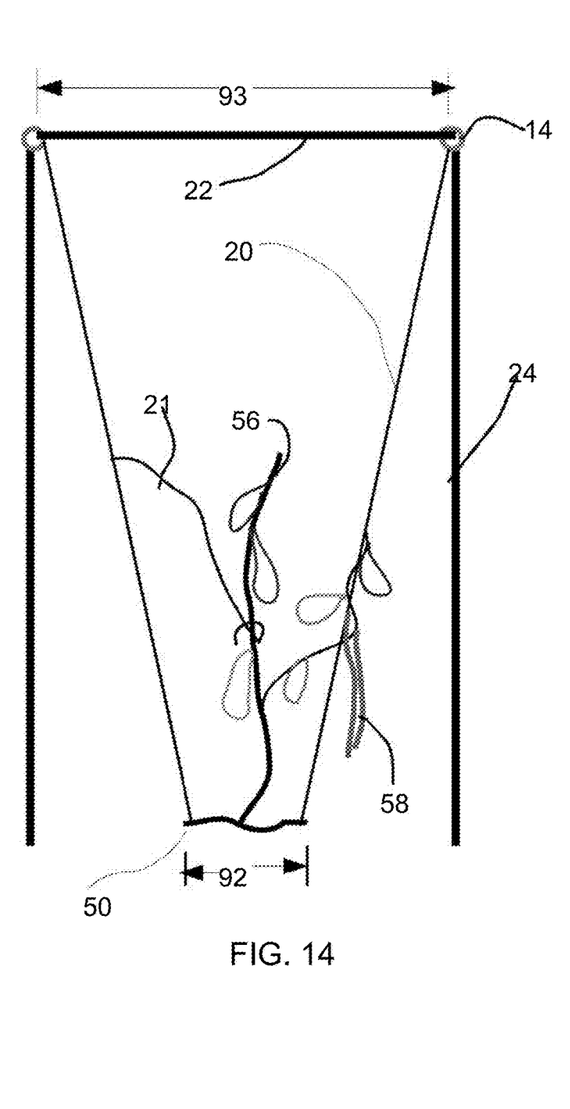
FIG. 14 is an end elevation view of an alternative embodiment of the system and method of the present invention.

FIG. 14 is an end elevation view of an alternative embodiment of the system and method of the present invention. It is illustrated applied to a system utilizing a conventional rectangular frame with vertical legs 24. The cords 20 are attached to one of the elevated horizontal rods 14 and then sloped downward toward the minimal planting area of ground 50 and anchored therein by one of many means. The cords may incorporate a branch 21 for active support of a plant 56 by tying, while the plant may also intertwine with cords 20. This branch is a unique feature not provided by other trellis designs, which rely on resting upon or vining onto the trellis. The sloping nature of the cords make for easier picking of the vegetables 58 and gives a width at the top 92 about double that at the bottom 90.

Figure 15:
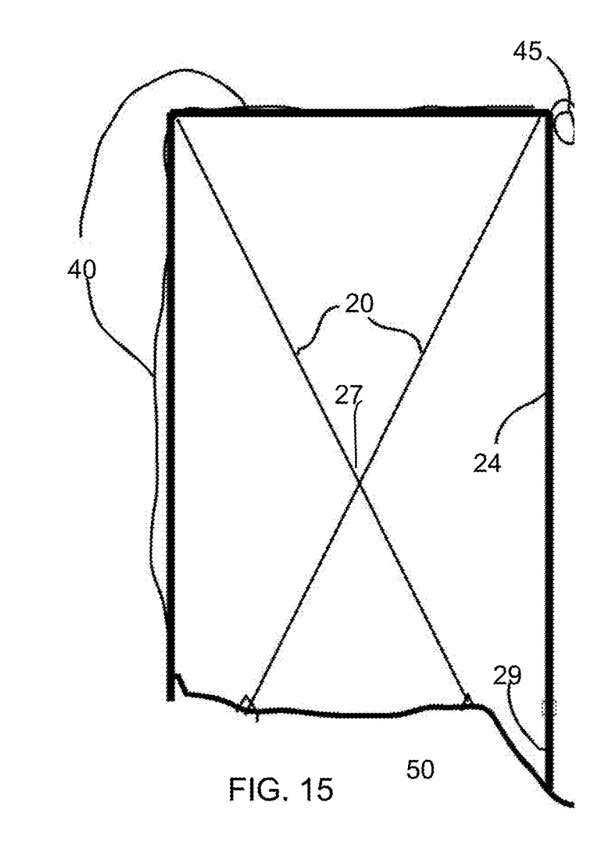
FIG. 15 provides an end elevation view of yet another variation of the system and method of the present invention.

FIG. 15 provides an end elevation view of another variation of the system and method of the present invention similar to that in FIG. 12. This depicts how the cords 20 can be crossing to opposite sides proximal the plant ground area 50. The cords 20 may come horizontally first across a horizontal rod 14 then slope down and across the plant area 50. For planting across a hillside, the downhill legs 24 will have an extensions 25. A net 40 keeps deer and other animals away from the vegetation.

FIG. 16 is a flowchart for the basic method of the present invention starting with step 100 of procuring one version of the kit specified for the present invention.

FIG. 17 provides a flowchart for an alternative method of the present invention. It starts with four leg members and attending parts.

While a presently preferred and alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

INDUSTRIAL APPLICABILITY

The present invention is expected to find commercial and/or industrial advantage by enabling gardeners to create greater growing volume above a plant area.

It is, therefore, one of the primary objects of the present invention to provide a vertical gardening support system that expands outward as plants grow up alongside the provided string or net trellis.

Another object of the present invention is to provide a durable, relatively inexpensive V-shaped vertical gardening system for climbing plants as well as non-wining tall plants.

Yet another object of the present invention is to provide a vertical gardening unit that can easily adapt to protection from deer and birds.

Still another object of the present invention is to provide a trellis apparatus efficiently adaptable to steep hillsides.

An additional objective of the present invention is to provide a compact kit product that can be erected into an adjustable height trellis.

Yet still another objective of the present invention is to provide a method for erecting the compact kit of the present invention into a relatively tall and wide trellis support for plants.

We claim:

1. A method for erecting a plant support trellis which provides expanding volume for growth in a vertical direction, wherein said method begins with procuring a trellis kit including: at least four leg members, at least two horizontal support rods, at least four corner connector fittings frictionally configured to engage with an end of one of said legs and an end of said horizontal support rod, and a net and a multiplicity of flaccid cords;

subsequently, erecting the four leg members generally vertical in an elongated V shape such that top end spacing is double that of bottom spacing in growing medium; and securing at least one of said multiplicity of flaccid cords at one end adjacent a growing medium and further engaged at a central portion with at least one of the horizontal support rods, and an opposite end secured in a separate portion of the growing medium.

2. The method of claim 1 wherein said four leg members are installed in pairs within growing medium of two plant-growing containers wherein the top ends of the leg members are angled away from the other in the same container.

3. The method of claim 1 wherein said net is attached at one edge to one of said horizontal support rods with the opposing edge attached adjacent the growing medium.

* * * * *